United States Patent [19]

Coetzer

[11] Patent Number: 4,457,989
[45] Date of Patent: Jul. 3, 1984

[54] ELECTROCHEMICAL CELL AND AN ANODE STRUCTURE FOR AN ELECTROCHEMICAL CELL

[75] Inventor: Johan Coetzer, Pretoria, South Africa

[73] Assignee: South African Inventions Development Corporation, South Africa

[21] Appl. No.: 306,904

[22] Filed: Sep. 28, 1981

[30] Foreign Application Priority Data

Oct. 9, 1980 [ZA] South Africa ................ 80/6256

[51] Int. Cl.³ .................. H01M 4/02; H01M 10/39
[52] U.S. Cl. .................................. 429/102; 429/103; 429/218; 429/233
[58] Field of Search ............... 429/102, 103, 112, 218, 429/233, 104; 252/500, 512

[56] References Cited

U.S. PATENT DOCUMENTS

| 4,002,807 | 1/1977 | Ludwig | 429/104 |
| 4,164,608 | 8/1979 | Coetzer | 429/218 X |
| 4,287,268 | 9/1981 | Coetzer | 429/103 |

FOREIGN PATENT DOCUMENTS 1346276 6/1972 United Kingdom .

OTHER PUBLICATIONS

R. M. Barrer & J. F. Cole, Interaction of Sodium Vapor with Synthetic Sodalite Sorption and Formation of Colors Sensors, C. P. Hys. Chem. Solids, vol. 29, pp. 1755-1758, (1968).
R. M. Barrer, Minerals as Sorbents and Molecular Sieves, 392-406, (1978).

Primary Examiner—Anthony Skapars
Attorney, Agent, or Firm—Arnold, White & Durkee

[57] ABSTRACT

The invention provides an electrochemical cell and an anode structure for an electrochemical cell. The anode structure comprises a substantially non-electronically conductive micromolecular sieve carrier wherein electrochemically active anode material in the form of an electronically conductive electropositive substance is sorbed and held in dispersed form, and a reservoir or source of the electropositive substance in contact with the carrier. The electropositive substance is liquid at the operating temperature of the cell.

17 Claims, 4 Drawing Figures

ELECTROCHEMICAL CELL AND AN ANODE STRUCTURE FOR AN ELECTROCHEMICAL CELL

This invention relates to an electrochemical cell, and to an anode structure for an electrochemical cell, suitable for secondary use (rechargeable).

In recent times, increasing attention has been given to the development of energy storage mechanisms.

These developments have, however, been retarded to varying degrees by the difficulties involved in effectively controlling mobile electrochemically active substances, and by the difficulties involved in operating at the elevated temperatures which in many cases are necessary for the effective operation of electrochemical cells.

According to one aspect of the invention, there is provided an electrochemical cell which comprises an anode which includes as its electrochemically active anode material an electronically conductive electropositive substance which is molten at the operating temperature of the cell;

a compatible electrolyte; and a compatible cathode, the cell further comprising a substantially non-electronically conductive micromolecular sieve carrier wherein the electropositive substance is sorbed and is held in dispersed form, the micromolecular sieve carrier being liquid-tight and located between and separating the electrolyte and cathode from the electropositive substance of the anode.

By liquid-tight is meant that all of the electrochemically active species, when going from the anode to the cathode or vice versa, has to go via the internal pore (cavity structure of the carrier).

According to another aspect of the invention, there is provided a composite anode structure comprising a substantially non-electronically conductive micromolecular sieve carrier wherein electrochemically active anode material in the form of an electronically conductive electropositive substance is sorbed and held in dispersed form; and a reservoir or source of the electropositive substance in contact with the carrier, for use with a compatible electrolyte and cathode in an electrochemical cell wherein the electropositive substance of the reservoir is molten and is separated by the carrier from the electrolyte.

Without being bound by theory, the Applicant believes that the electropositive substance may form electronically conductive pathways extending along at least some of the channels and/or pores in the carrier, thereby placing at least some of the windows in the surface of the carrier in electronic contact with one another via the interior of the carrier. These pathways, in use, can thus act to render the carrier, when it is doped with the electropositive substance, electronically conductive as a whole, via the pathways, so that electrons can be conducted along the pathways from the interface between the carrier and the electrolyte, to the interface between the carrier and the electropositive substance of the anode.

The Applicant believes that it may be possible that the electropositive substance is sorbed in elemental form, the electropositive substance being held in dispersed form in the carrier, and being mobile in atomic or elemental form along the channels and/or pores of the carrier to occupy suitable sites which have been vacated by other atoms of the electro-positive substance, so that it can move, in use, through the carrier from the anode to the electrolyte.

When there is a danger, as when the electrolyte is liquid at the operating temperature of the cell, that the electropositive substance may react chemically in an undesirable fashion with the electrolyte, e.g. with anions of the electrolyte, the carrier, when it contains the sorbed electropositive substance, may be selected or modified such that the windows in its surface to its microporous interior, prevent sufficient access to the interior of the carrier of e.g. the anions of the electrolyte, for the undesirable reaction to take place. Likewise, when as described hereunder the electrolyte selected is an aqueous solution, the carrier, when containing the sorbed electropositive substance, may be selected or modified such that the windows or pores in its surface do not permit access to its interior of water molecules.

The electropositive substance will be molten at the operating temperature of the cell and may comprise or include an alkali metal or alkaline earth metal, a combination or alloy of two or more alkali metals or alkaline earth metals, or a combination or alloy of one or more alkali metals or alkaline earth metals with one or more other substances. In other words, the alkali metal or alkaline earth metal or metals may be used alone or in combination of two or more thereof, or one, two or more thereof may be used in a composition or alloy with one or more compatible other substances, provided they are such that the electropositive substance is molten at the operating temperature of the cell.

The alkali metal or metals of the electro-positive substance may be in any suitable combination containing for example lithium, sodium, and/or potassium. The alkaline earth metals may likewise be in any suitable combination of alkaline earth metals, such as calcium or magnesium. The electropositive substance, as mentioned above, is molten at the operation temperature of the cell. For use at atmospheric pressure, certain alloys of sodium and potassium are particularly suitable as they have melting points below 100° C., and potassium and particularly sodium can be considered for use alone because of their availability at competitive prices.

By 'micromolecular sieve carrier' is meant a molecular sieve carrier having interconnected cavities and/or channels in its interior and windows and/or pores in its surface leading to said cavities and channels, the windows, pores, cavities and/or channels having a size of not more than 50 Angstroms and preferably less than 20 Angstroms, or, when for use with an electrolyte which is an aqueous solution, such that water molecules cannot be sorbed into the interior of the carrier, irrespective of whether other sorbed species are present in the cavities of the carrier.

Suitable micromolecular sieves are mineral micromolecular sieve carriers, i.e. inorganic lattice or framework structures, although certain essentially organic micromolecular sieve carriers such as clathrates may, in certain circumstances, be suitable as mentioned hereunder.

Suitable mineral micromolecular sieve carriers may be selected from the group of substances which make up the tectosilicates, i.e. the class of substances also known as "framework silicates" which may be natural or synthetic, crystalline or non-crystalline/amorphous, and which include:

silicates, e.g. silica gel zeolites
felspars
felspathoids
being silicates of a structural type in which all four oxygen atoms of the silicate tetrahedra are shared with neighbouring tetrahedra. The framework of the tectosilicate is made up of silicon atoms with in some cases aluminium atoms, together with other atoms. Mineral micromolecular sieves include also mixtures of or analogues of tectosilicates in which the silicon and/or aluminium atoms of the framework may be substituted amongst others by atoms of one or more of:

iron
beryllium
boron
phosphorous
carbon
germanium and
gallium in minor or major proportions and wherein the micromolecular sieving characteristics and properties are unaffected by the substitution. As long as their properties relevant to the present invention are substantially unaffected, these analogues are regarded as tectosilicates in the context of the present specification.

Conveniently, for molten salt electrolytes, the micromolecular sieve carrier is a zeolite, or when the electrolyte is to be aqueous, the carrier may be a tectosilicate which cannot sorb water e.g. a felspar or felspathoid.

Zeolites, felspars and felspathoids are in a class of crystalline or amorphous natural or synthetic materials which contain aluminium and silicon in fairly definite proportions, and their analogues. For a more detailed discussion of zeolites, reference can be made to the January 1975 publication of the International Union of Pure and Applied Chemistry entitled 'Chemical Nomenclature and Formulation of Compositions, of Synthetic and Natural Zeolites'.

Zeolites contain sorbed water molecules which may be removed, usually reversibly, by heat and/or evacuation. While it is expected that zeolite molecular sieve carriers which are at least partially dehydrated and usually fully dehydrated will generally be used, the presence of water in the zeolite may, in certain cases, be an advantage to enhance ionic conductivity depending on the mechanism of the cell reaction as discussed hereunder.

Zeolites felspars and felspathoids are usually possessed of a reasonably ordered internal structure, exhibit a high internal surface area and are characterised by the presence of a multiplicity of regular arrays of molecular cavities, i.e. channels and/or cavities opening out of the surface of the zeolite via windows and/or pores. Other tectosilicates, particularly if amorphous or non-crystalline, have a substantially less ordered or indeed unordered internal structure, while however retaining suitable arrays of molecular cavities.

It is believed that zeolites in their hydrated form can be represented by the following structural formula:

$M_{2/n}O.Al_2O_3.XSiO_2.YH_2O$ where M is a cation of n valance; and X and Y are independent variables that are a function of the composition of the starting mixture, and the manner of formation.

It has been found that suitable tectosilicate crystals can have a sufficiently high physical strength for effective use in the cell of the invention. (When the tectosilicate is a powder, it may be compacted and supported, for example in a porous container for use).

In addition, it has been found that tectosilicate crystals which have been doped with an electropositive substance can be sufficiently resistant to electrochemical and thermal damage during repeated use in a cell according to the present invention.

When crystalline tectosilicates are used, physical or electrochemical failure of tectosilicates doped with the electropositive substances should thus not be factors which contribute significantly, if at all, towards failure of cells according to this invention.

In the present invention the micromolecular sieve carrier is designed to have a three-dimensional structural skeleton which remains physically and electrochemically stable, so that it will not collapse significantly as a result of the electrochemical reaction during normal use, and will continue to function as a sieve permitting diffusion therethrough of the electropositive substance, while preventing access to the electropositive substance in its interior by anions of the electrolyte with which it is used, in cases where the anions react undesirably with the electropositive substance of the anode, and preventing access to water when the electrolyte is an aqueous solution.

These aspects should thus be borne in mind in selecting the particular molecular sieve carrier for use with the selected electropositive substances and electrolytes in carrying out the invention.

It should be noted, however, that when certain carriers are doped with extremely electropositive substances such as lithium metal alone or in combination with other metals, substantial modification of the carrier lattice can result. It has been found, however, that such modified lattices still possess the necessary properties in that they can act as carriers and/or sieves for the electropositive substance, are sufficiently electrochemically inert or relatively electrochemically inert during use in a cell, and can prevent access to the electropositive substance by undesireable chemical species or, when present, water from the electrolyte.

Such carriers, for example tectosilicates such as zeolites which have been physically and/or chemically modified during doping with the selected electropositive substances, but which still possess the necessary properties, may thus be usefully employed as micromolecular sieve carriers in the anodes of this invention, and for the purpose of this specification, these modified tectosilicates, zeolites, etc., are still regarded as tectosilicates, zeolites, etc.

It should further be noted that in the case of some tectosilicates incidental cation exchange may occur during use of the anodes in accordance with the invention, in some electrochemical cells. Such reactions are well known and merely change the sizes of the windows and pores of the carrier lattice, and this aspect should be borne in mind in selecting the electropositive substance and carrier, to ensure that the pores or windows of the carrier are of a desired size to permit passage of the electropositive substance therethrough, while excluding water of the electrolyte when an aqueous electrolyte is used in the cells, and undesireable anions of the electrolyte in cases where these anions are chemically unstable with respect to the electropositive substance. Once again, these are still regarded as tectosilicates of the type in question.

Thus, it should be appreciated that while the tectosilicate molecular sieve carriers of this invention may, in certain instances, after doping or after having been subjected to several charge/discharge cycles in a cell, no longer strictly be in the form of tectosilicates as such in the usual sense, they may still be regarded as such, or at least as mineral micromolecular sieve carriers in the context of this invention, provided they exhibit the requisite properties.

Thus, where the tectosilicate molecular sieve carriers of the electrodes of this invention are in the form of modified tectosilicates, they are such that while physically or chemically modified, they still possess the appropriate molecular cavities or pores for receiving the electropositive substance, still possess the channels or pores which lead to the cavities, and still have windows of the appropriate size.

Thus, where the molecular sieve carriers of this invention are in the form of modified substances, they will be those which have windows, channels, pores and cavities for receiving the electropositive substances, and for permitting passage therethrough of the electropositive substances, while excluding water and/or undesireable electrolyte anions.

By taking into consideration factors such as pore or channel size, cavity size and window size, and the ability to sorb electropositive substances in effective quantities, while permitting high mobility or passage therethrough of the electropositive substances and while excluding water and/or such anions of the electrolyte which are unstable with respect to the electropositive substances therefrom, a rough guide can be obtained for the selection of the appropriate micromolecular sieve carriers for use in accordance with the invention.

Further factors which can serve as a guide, can be the degree of porosity, the density, the availability, and the mechanical strength, the stability and the electronic conductivity or absence thereof, of the doped micromolecular sieve carriers.

For example, sodalite has the right structural properties to permit it to function as described herein as a micromolecular sieve carrier for the purpose of this invention. Such aluminosilicates, or the like, which exhibit acceptable structural properties to function as required by this invention, may be suitable tectosilicate molecular sieve carriers.

The micromolecular sieve carrier should preferably thus be such that the electropositive substance when sorbed therein, will be held therein in finely dispersed elemental form, e.g. possibly in atomic, molecular, atomic cluster or molecular cluster form to present its greatest availability for electrochemical activity during use.

The carrier should further preferably be such that it will hold an effective amount of the electropositive substance therein for effective electronic, and if necessary ionic, conduction for the electropositive substance to move therethrough in effective quantities.

In the present invention, it is believed that the carriers may in fact act as sieves, permitting diffusion therethrough of the electropositive substances in elemental, atomic or ionic form from the anode to the electrolyte during discharge of the cell, while preventing access to the electropositive substances contained therein by water and/or the anions of the electrolyte if unstable with respect to the electropositive substances. In use, the function of the carriers is thus to prevent reduction of the electrolyte by the electropositive substances contained in the anode, and to prevent reaction of these electropositive substances with any water in the electrolyte. It is contemplated that the cell of the present invention can, if desired, be used as a secondary or rechargeable cell, and during charging, the electropositive substances will diffuse from the electrolyte to the anode.

The anode structures of the present invention are of particular utility in electrochemical cells employing liquid molten salt electrolytes or aqueous solution electrolytes and designed to operate at relatively low temperatures, for example, of the order of room temperature up to about 360° C.

In such cells, the cathodes can comprise an oxide of one or more transition metals selected for example from the group consisting of manganese, iron and nickel, or an intermediate refractory hard metal compound of at least one metal selected from the group consisting of chromium, manganese, iron, cobalt and nickel, with at least one non-metal selected from the group consisting of carbon, boron, nitrogen, silicon and phosphorous which has been activated by halogenation. Thus, for example, the cathode may comprise a refractory hard metal compound which is an activated carbide, of iron, chromium or manganese.

Instead, the cathode may comprise sulphur and/or selenium, and a micromolecular sieve carrier, for example a tectosilicate, wherein the sulphur and/or selenium is sorbed, and is held captive during use of the cathode in the cell. The sulphur and/or selenium may for example be sorbed into a dehydrated zeolite molecular sieve carrier which may be selected from the group consisting of erionite, faujasite, synthetic zeolite 3A, zeolite 4A, and zeolite 13X. The zeolite carrier material will be made electron conductive by addition of a suitable electron conductive material such as graphite.

For such low temperature cells, the electrolyte may be an aqueous acid or base, for example an aqueous solution of sodium hydroxide or potassium hydroxide, or it may be a molten inorganic salt such as an iodide-based inorganic salt electrolyte. Thus, to test this possibility, the eutectic mixture of lithium iodide/potassium iodide was prepared in the ratio described by D. B. Leiser and A. J. Whittemore Jr. *J Amer. Ceram. Soc.* 50 (1961), 60. This mixture was doped with 99.5% pure strontium iodide obtained from Cerac Inc. The components were mixed and ground together into a fine powder and melted in glass tubes under a flowing stream of argon gas.

The temperatures were recorded where the mixtures melted and solidified. The homogeneous solid mixtures were subsequently ground and accurate melting point determinations were carried out. The strontium iodide added varied between about 25% and about 50% by mass of the mixture. Melting points were found to lie in the region of 220° C. and 240° C., whereas the lithium iodide/potassium iodide eutectic mixture was confirmed to melt at about 260° C.

Instead the electrolyte may be a molten inorganic salt electrolyte having the general formula:

$$M\ Al\ Hal_4$$

in which M comprises one or more alkali or alkaline earth metal cations and Hal comprises one or more halides, the proportions of the alkali or alkaline earth metal cations and halide anions conveniently being such that the above stoichiometric product is maintained, and the alkali metal cations and halide anions being selected such that the electrolyte has a sufficiently low melting point to permit use in its molten state at the desired operating temperature of the cell.

When such electrolyte is used with a tectosilicate-based carrier, and the electropositive substance of the anode, (for example one or more alkali metals) is capable of reducing the aluminium of the electrolyte to cause it to plate out on the anode and/or separate from the electrolyte for example to precipitate, the window or pore size of the molecular sieve carrier of the anode should be such that the windows exclude the Al Hal$_4{}^{1-}$ anions of the electrolyte from access to the interior of the zeolite of the anode. When these halide ions are AlCl$_4{}^{1-}$, the window or pore size of the tectosilicate should be such as comfortably to exclude these anions, whereas easily to permit access via the windows or pores to the interior of the zeolite of the electropositive material, for example atoms or ions of lithium, sodium and/or potassium.

In this way, the Al Hal$_4{}^{1-}$ anions are prevented from coming into direct contact with the electropositive material in its elemental or atomic/molecular form, so that reduction and separation of the aluminium by means of a back reaction cannot directly and easily take place.

Tectosilicate molecular sieve carriers which are suitable for use in conjunction with molten salt electrolites of the formula M Al Hal$_4$, may be selected from the group consisting in sodalite, carnegieite, zeolite 4A, zeolite 13X and mordenite.

In the case of aqueous electrolytes, testing them as the electrolytes in cells according to the invention having sodium/potassium anodes and cathodes comprising manganese dioxide promises to provide excellent electrochemical behaviour at operating temperatures below 100° C.

When such electrolytes are used with a tectosilicate-based carrier, the electropositive substance of the anode, (for example one or more alkali metals) is capable of reacting with the water of the electrolyte, so the window or pore size of the molecular sieve carrier should be such that the windows exclude the water of the electrolyte from access to the interior of the anode. The window or pore size of the tectosilicate should be such as comfortably to exclude water, whereas easily to permit access via the windows or pores to the interior of the anode of the electropositive material, for example atoms or ions of sodium, lithium, and/or potassium.

In this way, water is prevented from coming into direct contact with the electropositive material in its elemental or atomic/molecular form, so that the undesired reaction cannot take place.

Without being bound by theory, it is believed that in micromolecular sieve carriers which have cavities in the form of capillary- or pipe-like channels, which may have a approximately equal to the pore or window size, the electropositive substance can possibly move along the channels during discharge from the source of electropositive material to the interface between the carrier and the electrolyte, and that in certain instances the electropositive substance in the channels may maintain electronic contact with the electropositive substance reservoir throughout the body of the carrier. In other words, the carrier will, in this case, be electronically conductive, via the electropositive substance in the channels, between the reservoir or source of electropositive substance and the electrolyte. In this regard it will be appreciated that the source of electropositive substance will not be in direct contact with the electrolyte, except via the doped micromolecular sieve carrier.

In the case where the doped molecular sieve carrier is an electron conductor, one possible mechanism is that during discharge of the cell, atoms of the electropositive substance ionize at the interface between the electrolyte and the molecular sieve carrier, and the ions pass into the electrolyte, the electrons from said ionization passing via the electropositive substance in the interior of the carrier to said source of electropositive material, which will act as or can be associated with a current collector. At the same time, atoms of the electropositive substance will pass from said source of anode material into the molecular sieve carrier material to replace those which have been ionized, rapid diffusion of the electropositive material taking place via the channels of the molecular sieve carrier from the anode towards the electrolyte.

According to this mechanism, the electropositive substance may be present in the form of electronically conductive threads or chains in the channels. It is possible, however, that, instead of the electropositive substance being present in the form of electronically conductive chains or threads in the channels, the electrochemically active sorbed electronically conductive substance atoms may form clusters with suitable cations forming part of the lattice or matrix of the molecular sieve material. These clusters may thus share electrons from the sorbed electropositive substance. Such electrons may be sufficiently mobile to move through the molecular sieve carrier from its interface with the electrolyte where ionization takes place, to the anode reservoir and thence to the collector.

If the mechanism suggested above whereby ionization takes place at the interface between the molecular sieve carrier and the electrolyte is, however, incorrect and ionization takes place at the interface of the molecular sieve carrier and the anode or source of electropositive substance, or a hybrid mechanism exists whereby ionization at the source is sufficiently predominant, then the molecular sieve carrier with the electropositive substance sorbed therein may not, strictly speaking, function as a sieve, but may instead function as a solid electrolyte. Ions instead of atoms will then diffuse rapidly through the molecular sieve carrier. This process may be enhanced by the presence of sorbed atoms in the form of clusters, the solid electrolyte being metal rich, e.g. Na$_4{}^{3+}$ clusters in sodalite. However, whether or not the carrier impregnated with the electropositive substance is regarded as a sieve or solid electrolyte, this does not affect its utility and function as described above, in the cells and anode structures of the present invention.

To prepare a carrier according to the invention, a tectosilicate, for example a suitable felspar or felspathoid or a zeolite which is fully or partially dehydrated by subjecting it to vacuum and heat, is exposed, optionally under pressure and after having been subjected to a vacuum, to a vapour of the electropositive substance to be sorbed into it. While it may not be necessary to saturate all the vacant sites in the zeolite molecular sieve carrier with the electropositive substance, and only a desired proportion of the vacant sites need be occupied thereby, in practice it is contemplated that as much of the electropositive material as possible will be sorbed into the zeolite molecular sieve carrier.

Pore or window size of the zeolite molecular sieve carrier may or may not, as the case may be, be modified by the sorption of the electropositive material, and the zeolite molecular sieve carrier will be chosen so that its channel and pore sizes, in particular its window sizes are, after doping, such that it operates effectively to exclude any anion which is unstable with respect to the alkali metal of the anode, or any water from the electrolyte from reacting with the electropositive substance in the channels in use. In other words if such modification takes place, the micro molecular sieve carrier and metals may be chosen so that the molecular sieve carrier finally obtained has suitable channel, pore and window sizes.

Thus, lithium, sodium or potassium may be used alone or such alkali metals may be used together, or they may be used together with other metals such as, for example, aluminium. It is believed that when an electropositive substance such as sodium or lithium is used together with another metal such as aluminium, both the alkali metal and the other metal such as aluminium, may be sorbed in the carrier, the other metal modifying the zeolite molecular sieve carrier by reducing effective channel, pore and/or window sizes to a desired value appropriate for the intended use of the anode. Thus, starting with a molecular sieve carrier which has channels, pores and particularly windows which are too large to exclude undesireable electrolyte ions, after sorption of the other metal these channels, pores and/or windows may be reduced in size by the presence of atoms of the other metal occluding them, so that they are at the right size to exclude any water or undesireable electrolyte ions, while permitting passage or entry of the electropositive alkali metal atoms/ions such as sodium, potassium and/or lithium.

The possibility is also contemplated that when the pore size of the carrier is sufficiently large, molecules of the electrolyte may, in the initial stage of the operation of the cell, be able to penetrate some way into the body of the carrier, at which point a reaction will occur with the electropositive substance, the resultant products of which serve to reduce the cavity size, thereby preventing further penetration of the electrolyte and any further reaction, so that the action of the cell is as described above, e.g. when sodium is the electropositive material, sodium aluminium chloride is the liquid electrolyte, and the reaction causes precipitation of aluminium metal which serves to block the cavities to the desired extent.

It will thus be appreciated that either a suitable molecular sieve carrier can be selected which initially has windows, pores and channels of the correct size, or one having such sizes which are too large, can be selected and modified during the sorption process so that it ends up with the pores, channels and windows of the appropriate size. In this case, the other metal, such as aluminium, or even nickel, which is used together with the electrochemically active electropositive alkali metal, can form an effective lining to the channels, to remain there while being relatively electrochemically inert in the cell, acting to reduce the channel, pore and/or window sizes, and acting also to increase electronic conductivity along the pathways provided by the channels containing the electrochemically active electropositive substance. Thus, certain species of the sorbed material can act to modify the molecular sieve carrier and to stabilize it while increasing its electronic conductivity along the pathways provided by the channels, whereas other species can act as the electropositive material. The electron-conducting properties of the molecular sieve carrier can thus, it is believed, be confined to the channels, whereas the body of the molecular sieve carrier material or at least that part thereof which is in direct contact with the liquid electrolyte, will be non-, or negligibly, electronically conductive to prevent plating of cations from the electrolyte onto the surface of the anode exposed to the electrolyte during charging.

This feature acts to prevent dendrite formation which is in many instances a cause of cell failure, since the plating of the electropositive material can only take place inside the cavity structure of the carrier, thereby preventing it from becoming detached from the anode structure and/or causing internal short circuits.

In specific embodiments of the invention when the carrier is a zeolite, the anode can comprise sodalite with sodium sorbed therein; mordenite with suitable proportions of potassium and sodium sorbed therein; or mordenite with suitable proportions of potassium and lithium sorbed therein.

In a further specific embodiment of the invention, where the material of the molecular sieve carrier is a non-, or negligibly, electronically conductive zeolite, it may be possible to dispense with a separate liquid electrolyte and to have the zeolite molecular sieve carrier in direct and intimate contact with a suitable compatible cathode, such as sulphur sorbed into graphite-coated zeolite 4A. In this case, the sulphur (in the form of polysulphide) can act as the electrolyte and the zeolite with sulphur sorbed therein can be regarded as a catholyte. In this instance, thus, the zeolite/sulphur catholyte is regarded as a combined electrolyte/cathode and the cells of the invention contemplate this possibility, with references to electrolyte and cathode in the context to be construed accordingly. If the zeolite material of the anode is too electronically conductive to permit this, it may, however, be necessary to provide a porous insulating layer between the carrier and the cathode, impregnated with a suitable liquid electrolyte. This porous insulating layer may be a suitable insulating undoped dehydrated zeolite material. This embodiment has the advantage that, apart from the anode or source of electropositive material, which will generally be molten, the cell will be substantially solid and zeolite-based.

It is further contemplated, when the cell can operate at a sufficiently low temperature, clathrate micromolecular sieve carriers can be used in the same way as the previously mentioned mineral micromolecular sieve carriers. They should not, when used with aqueous electrolytes, for the same reasons, be capable of sorbing water, and should have a similar channel-type structure, and similarly non-tectosilicate oxide micromolecular sieve carriers may be used.

The invention will now be described, by way of example, with reference to the accompanying diagrammatic drawings, in which.

Figure 1:
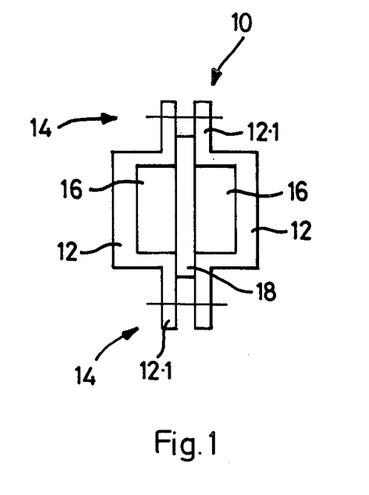
FIG. 1 shows a schematic diagram of a device used as a conductivity cell for conductivity tests carried out on a zeolite carrier for a cell according to the invention.
Figure 2:
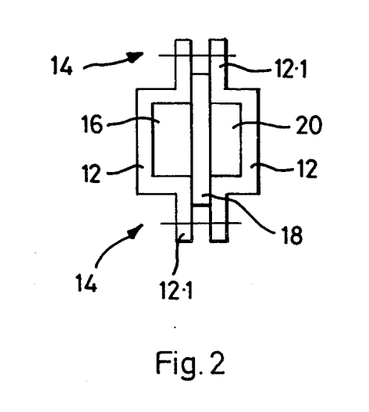
FIG. 2 shows a similar diagram of a test cell according to the invention.

In FIGS. 1 and 2 of the drawings, the same reference numerals are used for the same parts, unless otherwise specified.

In FIG. 1, a conductivity cell generally designated 10, comprises a pair of stainless steel cups 12 held together by peripherally spaced insulated locking screws 14. In the cups 12 are molten alkali metal electrodes 16, and they are separated by a carrier 18 for a cell according to the invention. The carrier is clamped between the rims 12.1 of the cups 12 and acts to separate the electrodes 16 from one another.

In FIG. 2, essentially the same arrangement is shown, except that one of the electrodes 16 is replaced by a liquid electrolyte/cathode mixture 20, so that the electrode 16 is an anode and the cups 12 act as current collectors.

The invention will further be described, with reference to the following non-limiting examples, carried out with the device and the cell of FIGS. 1 and 2.

EXAMPLE 1

With reference to FIG. 1, the carrier 18 was made in the form of a compact or pellet containing zeolite 4A and kaolin. A mixture of equal parts by mass of zeolite 4A and kaolin was ball-milled for 24 hours, and a pellet was pressed on a linear press at a pressure of $2 \times 10^5$ kPa. The pellet was fired at 650° C. for 3 hours. After cooling, the artifact was placed in a freshly prepared zeolite 4A gel in which the kaolin was converted to zeolite 4A and the pellet was further densified by back impregnation of the zeolite 4A from the fresh gel.

The fully densified pellet artifact was removed from the gel after 10 days, washed with distilled water and dehydrated at 360° C. and 10 kPa for 6 hours. The pellet was then subjected to sodium metal impregnation from the gas phase under a vacuum at 350° C. for 2–3 hours.

The pellet loaded with sodium sorbed therein was then handled in a glovebox containing dry argon, and the device of FIG. 1 was constructed, and electrically connected to form a conductivity cell. This procedure was repeated a number of times, and a number of such conductivity cells were constructed, employing also potassium and lithium as dopants.

Figure 3:
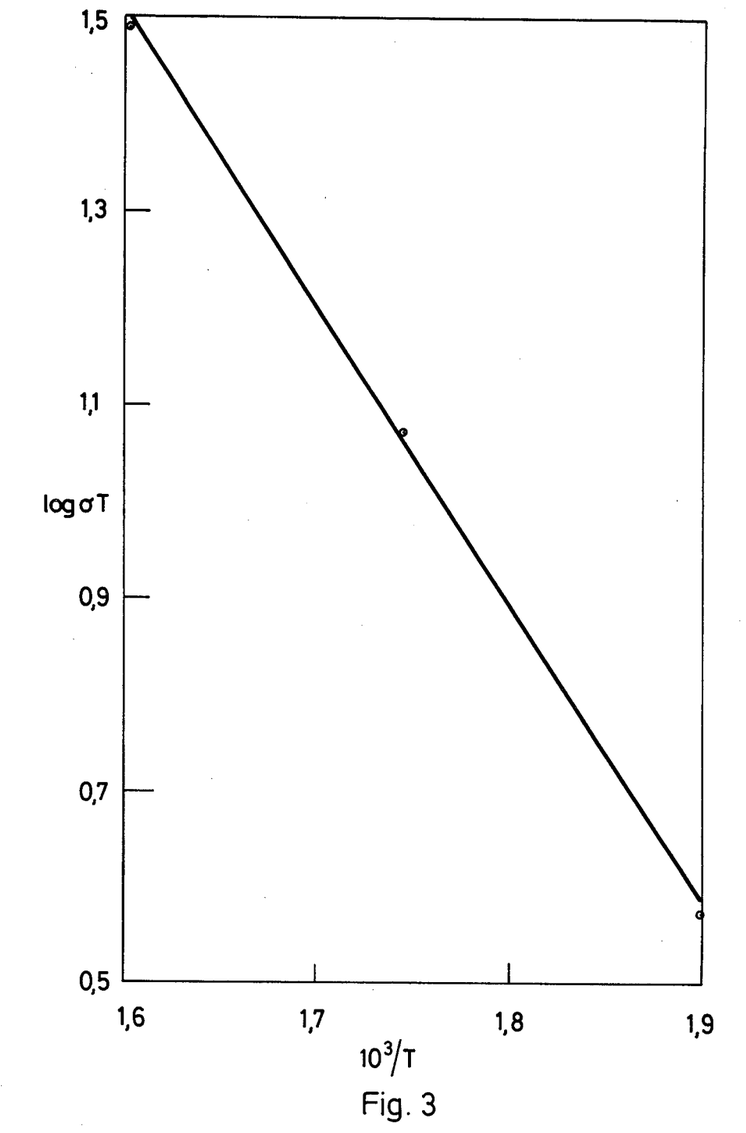
FIGS. 3 and 4 show graphical results of tests conducted with the device of FIG. 1.

Alternating current (AC) resistance R, against temperature T, was measured for the pellets. A typical graph of pellet conductivity as log $\sigma$ T (wherein $\sigma$ is the specific conductivity defined as $=d/A.R.$ where d is pellet thickness, A is pellet cross-sectional area, and R is the measured resistance in ohms) against temperature ($10^3/T$) is shown in FIG. 3.

Comparative summarised test results are set out in the following Table, Table 1 which compares a sodium impregnated pellet with pellets impregnated with lithium and potassium respectively:

TABLE 1

| Metal | $(\Omega cm)^{-1}$ | T °C. |
|---|---|---|
| Li | 0,006 | 350 |
| Na | 0,050 | 350 |
| K | 0,010 | 350 |

EXAMPLE 2

Further compacts or pellets were made containing zeolite 4A.

The pellets of Example 2 were then dehydrated and treated with sodium, as described in Example 1 and tested at different temperatures.

Figure 4:
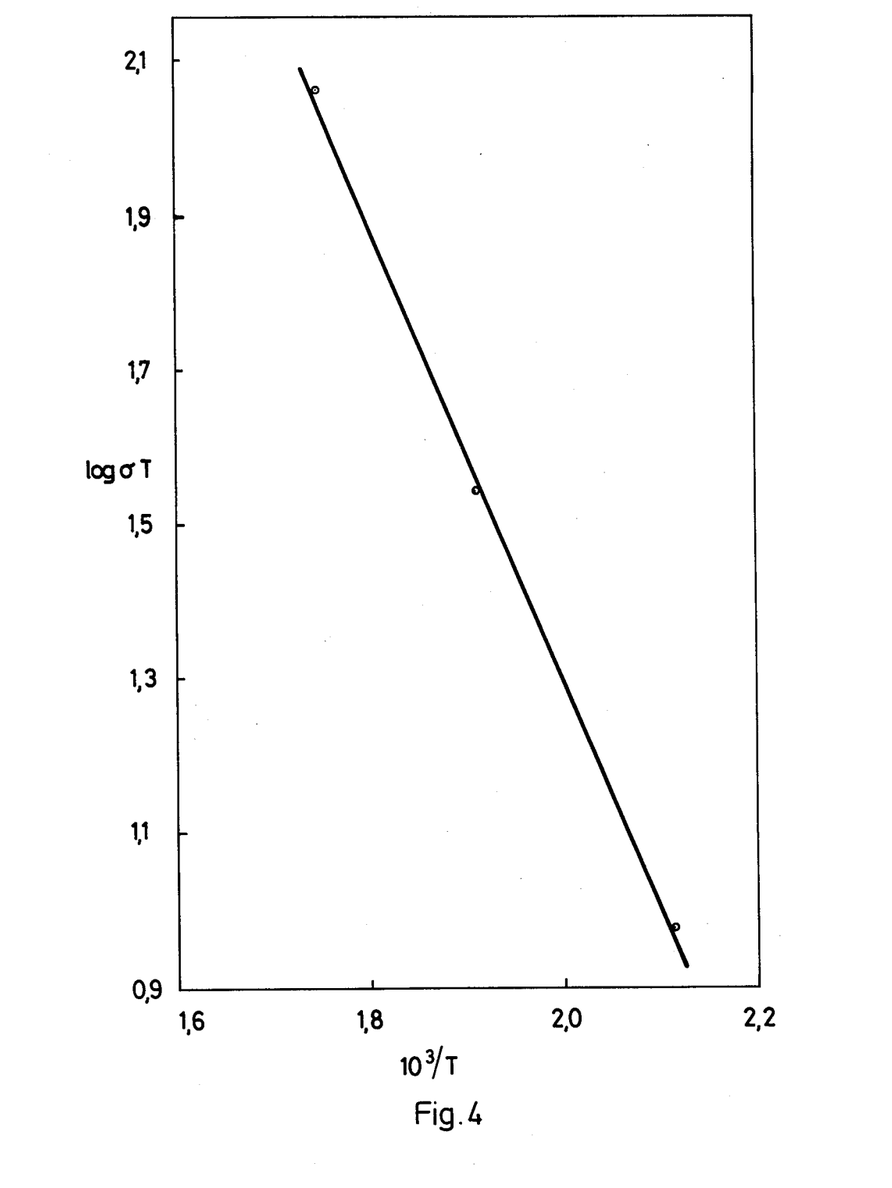

FIG. 4 shows a typical plot of log $\sigma$ T against $10^3/T$ using the conductivity cell of FIG. 1.

Test results are summarized in the following Table, Table 2, for sodium:

TABLE 2

| $(\Omega cm)^{-1}$ | T °C. |
|---|---|
| 0,006 | 200 |
| 0,020 | 250 |
| 0,060 | 300 |

EXAMPLE 3

Small electrochemical test cells were made in accordance with FIG. 2, comprising an alkali metal anode 16, a zeolite having the alkali metal sorbed therein as the pellet 18, and a suitable compatible liquid electrolyte and cathode 20. A test was conducted using a sodium anode, a zeolite 4A impregnated with sodium as the pellet, and a potassium iodide/ lithium iodide molten salt electrolyte mixed with cathode material comprising zeolite 13X crystals doped with sorbed sulphur and containing graphite for electronic conductivity. In this case, an open current voltage of 1.9 V was obtained together with a short circuit current of 35 mA, with an effective surface area of about 1 cm$^2$ at 300° C.

A further cell was constructed using potassium for the anode, a zeolite 4A for a pellet impregnated with potassium, a lithium aluminium chloride electrolyte and a zeolite 4A containing impregnated sulphur as the cathode.

In this case, an open current voltage of 2.0 V was obtained, with a short circuit current of 5 mA at a temperature of 200° C., with an effective surface area of about 1 cm$^2$.

Finally, a cell was constructed using a sodium anode, sodium impregnated into a zeolite carrier, a sodium aluminium chloride electrolyte, and as a cathode sulphur sorbed into zeolite 4A. From this cell an open current voltage of 1.9 V was obtained, with a short circuit current of about 10 mA, at 200° C. with an effective surface area of about 1 cm$^2$.

In all the above cells, the zeolite of the carrier was prepared by mixing with kaolin as described in Example 1.

All the cells described above failed at various times, for reasons essentially unrelated to the electrochemistry thereof, such as sealing problems, artifact cracking, etc. It is expected that routine experimentation will overcome these problems. While some of these cells failed after a matter of hours, others lasted up to 7 days.

An advantage of the present invention is that it provides a cell in which the electrolyte is separated from the anode by a carrier which has a conductivity several orders of magnitude higher than that of undoped tectosilicates, e.g. the zeolites reported in Breck, Donald W. 'Zeolite Molecular Sieves', published by John Wiley & Sons, 1974, at pages 397 to 410.

It should be noted that the carrier tested, as appears from FIGS. 3 and 4 hereof, has a conductivity which increases with the operating temperature i.e. it shows a positive temperature coefficient of conductivity which indicates that the conductivity may be ionic or hybrid rather than purely metallic or electronic.

As regards the construction of the carrier of the present invention, it is intended to be completely liquid-tight in use. For this reason every attempt should be made to make it completely dense, with no macroporous spaces, channels, etc., therein. As regards its function, it should further be noted that, after such initial stabilization or conditioning period as may be necessary, there is in fact no change in the average chemical composition of the carrier during charging and discharging, and no change in the average oxidation state of the electropositive substance therein.

What is claimed is:

1. A composite anode structure comprising
a substantially non-electronically conductive micromolecular sieve carrier wherein electrochemically active anode material in the form of an electronically conductive electropositive substance is sorbed and held in dispersed form; and
a reservoir or source of the electropositive substance in contact with the carrier, for use with a compatible electrolyte and cathode in an electrochemical cell wherein the electropositive substance of the reservoir is molten and is separated by the carrier from the electrolyte.

2. An electrochemical cell which comprises a composite anode structure as claimed in claim 1 together with a compatible electrolyte and a compatible cathode, the electronically conductive electropositive substance being molten at the operating temperature of the cell and the micromolecular sieve carrier being liquid-tight and located between and separating the electrolyte and cathode from the electropositive substance of the reservoir or source.

3. A cell as claimed in claim 2, in which the electrolyte is liquid at the operating temperature of the cell and can react undesirably with the sorbed electropositive substance, and in which the carrier is selected or modified so that the windows in its surface to its microporous interior prevent sufficient access to its interior for such undesirable reaction to take place.

4. A cell as claimed in claim 2, in which the electropositive substance of the anode structure is selected from the group consisting of
alkali metals,
alkaline earth metals,
combinations or alloys of two or more alkali metals and/or alkaline earth metals, and
combinations or alloys of one or more alkali metals and/or alkaline earth metals with one or more other substances.

5. A cell as claimed in claim 4, in which the electropositive substance is sodium or an alloy of sodium and potassium.

6. A cell as claimed in claim 1, in which the carrier is a mineral micromolecular sieve carrier.

7. A cell as claimed in claim 6 in which the carrier is a tectosilicate.

8. A cell as claimed in claim 7, in which the carrier is selected from the group consisting in zeolites, felspars, felspathoids and silicates.

9. A cell as claimed in claim 8, in which the electrolyte is a molten salt electrolyte, and the carrier is a zeolite.

10. A cell as claimed in claim 8, in which the electrolyte is aqueous inorganic salt solution, and in which the carrier is a felspar or felspathoid.

11. A cell as claimed in claim 2, in which the cathode comprises as electrochemically active cathode material a substance selected from the group consisting of
oxides of one or more transition metals,
activated intermediate refractory hard metal compounds, and
sulphur or silenium sorbed in a micromolecular sieve carrier.

12. A cell as claimed in claim 1, in which the electrolyte is selected from the group consisting of
aqueous solutions of bases, acids, and inorganic salts, and molten inorganic salts.

13. An anode structure as claimed in claim 1, in which the electropositive anode substance is selected from the group consisting of
alkali metals,
alkaline earth metals,
combinations or alloys of two or more alkali metals and/or alkaline earth metals, and
combinations or alloys of one or more alkali metals and/or alkaline earth metals with one or more other substances.

14. An anode structure as claimed in claim 13, in which the electropositive substance is sodium or an alloy of sodium and potassium.

15. An anode structure as claimed in claim 1, in which the carrier is a mineral micromolecular sieve carrier.

16. An anode structure as claimed in claim 15, in which the carrier is a tectosilicate.

17. An anode structure as claimed in claim 16, in which the carrier is selected from the group consisting in zeolites, felspars, felspathoids and silicates.

* * * * *

UNITED STATES PATENT OFFICE
CERTIFICATE OF CORRECTION

Patent No. 4,457,989  Dated July 3, 1984

Inventor(s) Johan Coetzer

It is certified that error appears in the above-identified patent and that said Letters Patent are hereby corrected as shown below:

Column 14, line 4, delete "1" and insert --2--

Column 14, line 25, delete "1" and insert --2--

Signed and Sealed this

Twenty-fifth Day of December 1984

[SEAL]

Attest:

Attesting Officer

GERALD J. MOSSINGHOFF

Commissioner of Patents and Trademarks